July 10, 1951

J. J. KRUSE 2,559,721

ICE GRIPPER FOR VEHICLE WHEELS

Filed May 16, 1950

INVENTOR:-
JOHN J. KRUSE

BY
H. G. Manning
ATTY.

Patented July 10, 1951

2,559,721

UNITED STATES PATENT OFFICE 2,559,721

ICE GRIPPER FOR VEHICLE WHEELS

John J. Kruse, Waterbury, Conn.

Application May 16, 1950, Serial No. 162,192

5 Claims. (Cl. 301—47)

This invention relates to anti-skid devices for attachment to vehicle wheels, and more particularly to a device comprising a plurality of retractable traction elements or studs which may be projected radially of the wheel whenever desired and which may be left upon the wheel permanently so as to be ready for use at any time.

One object of this invention is to provide a device of the above nature wherein the traction elements are closely spaced apart in a continuous series around the periphery of the device, whereby a plurality of said elements will always be in engagement with the ground or the ice when the device is in operating condition.

Another object is to provide a device of the above nature in which the traction elements are mounted upon a resilient member which receives yieldable support at intervals around the periphery of the device, whereby all of the traction elements will be successively effective as the wheel rotates.

Another object is to provide a device of the above nature, in which the projection and retraction of all of the traction elements will be attained by the movement of a single manually, mechanically, or hydraulically adjustable cam.

A further object is to provide a device of the above nature which will be simple in construction, inexpensive to manufacture, easy to install and manipulate, compact, smooth-running, ornamental in appearance, and very efficient and durable in use.

With these and other objects in view, there has been illustrated on the accompanying drawing one form in which the invention may conveniently be embodied in practice.

Figure 1:
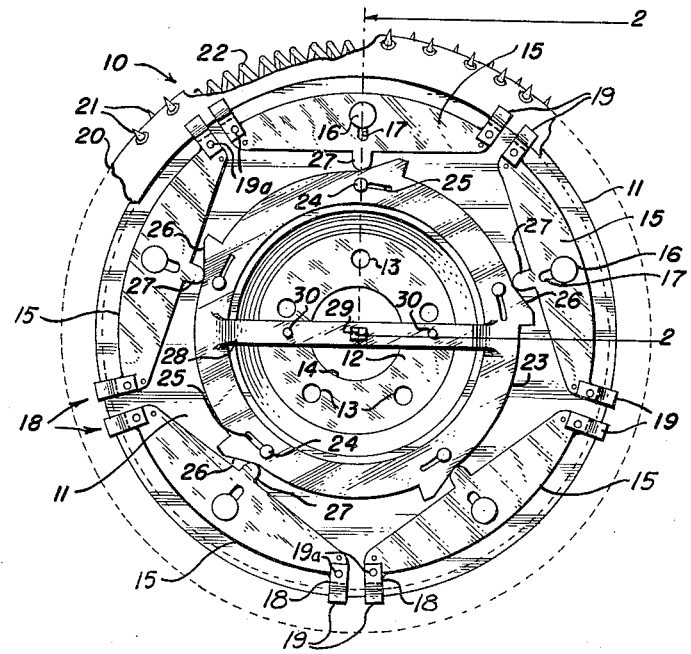
Fig. 1 is a front view, partly broken away, showing the improved anti-skid device as it would appear when the traction studs are withdrawn to retracted position.
Figure 2:
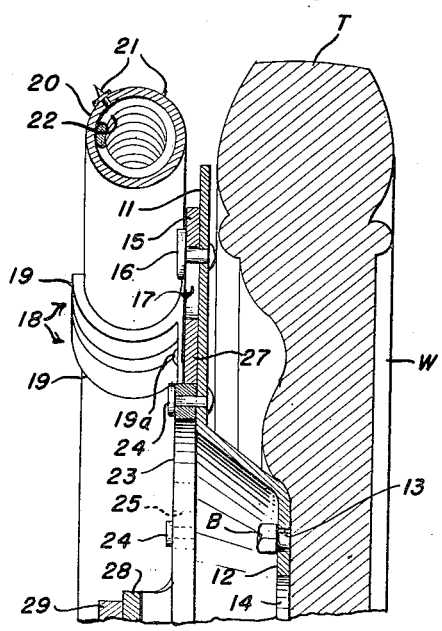
Fig. 2 is a cross-sectional view, taken on the line 2—2 of Fig. 1, showing a portion of the anti-skid device on an enlarged scale, and also showing a portion of a wheel to which the device may be attached.

Referring now to the drawing, in which like reference numerals denote corresponding parts throughout the several views, the numeral 10 indicates generally the improved anti-skid device comprising a circular base plate 11, which is dished so as to provide an outwardly-offset central portion 12.

In order to facilitate the securement of the base plate 11 to a wheel W, the offset portion 12 is provided with a circular series of apertures 13, which are adapted to receive the wheel bolts B, and which surround a relatively large central opening 14.

Provision is made of a series of radially slidable segmental bracket plates 15, which are held flat-wise against the outer face of the base plate 11 by means of headed studs 16 engaged in radial slots 17 in said bracket plates, and which are located at regular intervals around a peripheral portion of said base plate.

The opposite end portions of the respective bracket plates 15 are provided with brackets 18 which are bent in a reverse direction and then outwardly so as to provide respective semi-circular arms 19 having a concave shape in a direction radially outward of the base plate 11. The brackets 18 are rigidly attached to the bracket plates 15 by suitable means such as rivets 19a, and are so located as to project radially outward of the outer edges of the bracket plates 15.

The bracket arms 19 serve as seats for an annular tube 20 of rubber or other suitable resilient material, having a plurality of sharp traction elements or studs 21 projecting from its outer surface. The studs 21 may, if desired, be molded into the rubber at the time of manufacture.

The tube 20 contains a continuous endless coil spring 22 which has a snug fit within said tube, and which is under sufficient tension to hold the tube 20 seated in the bracket arms 19, and also to urge the bracket plates 15 inwardly toward the center of the base plate 11. Inasmuch as the coil spring 22 is snugly engaged within the tube 20, it will be seen that said spring reinforces said tube, increasing the resiliency thereof, and tends to prevent it from collapsing.

In order to project the traction elements 21 outwardly beyond the tread of the wheel W, and thus engage the surface upon which said wheel may be running, provision is made of a ring-shaped cam 23 which is secured in a concentric position upon the outer surface of the base plate 11 inwardly of the bracket plates 15 by means of a plurality of headed studs 24. The studs 24 are engaged in slots 25 which extend in a circumferential direction in said cam so that the latter may have a limited rotating movement with respect to said base plate.

The cam 23 is provided with a plurality of outwardly-extending inclined noses 26 which engage respective inwardly-extending lugs 27 integrally formed at central locations upon the inner edges of the respective segmental bracket plates 15.

Operation of the ring-shaped cam 23 is facilitated by an operating bar 28 diametrically attached to said cam and provided with a central nut 29 and a pair of projecting studs 30 which may be engaged by a suitable wrench.

Thus, it will be seen that twisting the ring-shaped cam 23 in one direction will press the bracket plates 15 and the tube 20 outwardly against the confining force of the coiled spring 22, so as to hold the traction elements or studs 21 in positions in which they may engage the ground or ice over which the wheel W may travel. When the increased tractive effect of the studs 21 is no longer needed, the cam 23 may be twisted in a reverse direction to release the bracket plates 15 and thus permit the studs 21 to be retracted by the action of the coil spring 22.

Operation

In order to prepare the improved anti-skid device 10 for operation, it will merely be necessary to secure said device to the wheel W by means of the wheel bolts B.

So long as good road conditions prevail, the vehicle may be operated in the normal manner, with the traction elements 21 held retracted and out of engagement with the road surface by the action of the coil springs 22.

When, however, the operator encounters icy or other slippery road conditions, it will merely be necessary for him to twist the ring-shaped cam 23 in a counter-clockwise direction, as viewed in Fig. 1, thus forcing the bracket plates 15, the tube 20, and the coiled spring 22 therein outwardly, so that the traction elements 21 will project beyond the wheel tread T into engagement with the road surface or ice.

One advantage of the anti-skid device herein disclosed is that the bracket plates 15 are permitted a slight rocking movement about the studs 16, so that the brackets 18 may yield when the tube 20 meets with an obstruction or irregularity in the road, and the possibility of damage to the anti-skid device will be minimized.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In an anti-skid device, a base plate adapted to be attached coaxially to a wheel, a plurality of segmental bracket plates mounted for radial sliding movement adjacent the periphery of said base plate, said bracket plates having outwardly projecting brackets providing seats which are concave in a direction radially outward of said base plate, a resilient annular member engaged in said seats and having outwardly-extending traction elements, and means for moving said bracket plates and the annular member thereon outwardly, whereby said traction elements may be projected radially of said device.

2. The invention as defined in claim 1, in which said annular member is a flexible tube having a coiled spring therein.

3. The invention as defined in claim 1, in which said annular member is a flexible tube having a coiled spring under tension therein, whereby said annular member will be urged to contracted condition and said bracket plates will be urged inwardly.

4. The invention as defined in claim 1, in which said means for moving said bracket plates comprises a circular cam rotatably mounted on said base plate, and having inclined cam noses engaged with lugs on said bracket plates, whereby rotation of said cam may move said bracket plates.

5. The invention as defined in claim 1, in which each of said bracket plates is mounted on said base plate by a stud on said base plate, said stud being engaged in a slot in said bracket plate, whereby a rocking movement of each bracket plate may be permitted when in projected position.

JOHN J. KRUSE.

REFERENCES CITED

The following references are of record in the file of this patent:

UNITED STATES PATENTS

| Number | Name | Date |
| --- | --- | --- |
| 2,044,812 | Roessel | June 23, 1936 |
| 2,241,849 | Fuchs | May 13, 1941 |

FOREIGN PATENTS

| Number | Country | Date |
| --- | --- | --- |
| 365,445 | France | June 27, 1906 |